(12) United States Patent
Peregrine et al.

(10) Patent No.: US 8,157,226 B2
(45) Date of Patent: Apr. 17, 2012

(54) MOUNTING SYSTEM FOR ATTACHING MULTIPLE LIGHT SOURCES FOR PHOTOGRAPHIC USE

(76) Inventors: Paul Kent Peregrine, Highlands Ranch, CO (US); Gary Lee Regester, Silver Plume, CO (US)

(*) Notice: Subject to any disclaimer, the term of this patent is extended or adjusted under 35 U.S.C. 154(b) by 216 days.

(21) Appl. No.: 12/565,619

(22) Filed: Sep. 23, 2009

(65) Prior Publication Data

US 2011/0069472 A1 Mar. 24, 2011

Related U.S. Application Data

(60) Provisional application No. 61/099,448, filed on Sep. 23, 2008.

(51) Int. Cl.
*F16M 11/00* (2006.01)

(52) U.S. Cl. ...................... 248/200; 248/205.1; 362/102; 362/431

(58) Field of Classification Search .................. 248/200, 248/205.1, 226.11, 274.1, 309.1; 362/102, 362/431
See application file for complete search history.

(56) References Cited

FOREIGN PATENT DOCUMENTS

GB 215922 A * 5/1984

* cited by examiner

*Primary Examiner* — Amy Sterling
*Assistant Examiner* — Erin W Smith
(74) *Attorney, Agent, or Firm* — Leyendecker and Lemire, LLC; Kurt Leyendecker

(57) ABSTRACT

Described herein is a mounting plate having a plurality of exterior edges. Each edge of the mounting plate has a mounting interface. Between each of the exterior edges is a flattened corner. Each of the planar corners has a pole mount disposed therein. The mounting plate also has a plurality of interior projections, each of the plurality of interior projections being disposed on an inner side of each of the planar corners. At least one of the plurality of interior projections has a stand mount disposed therein and at least a second one of the plurality of interior projections has an umbrella mount disposed therein.

20 Claims, 15 Drawing Sheets

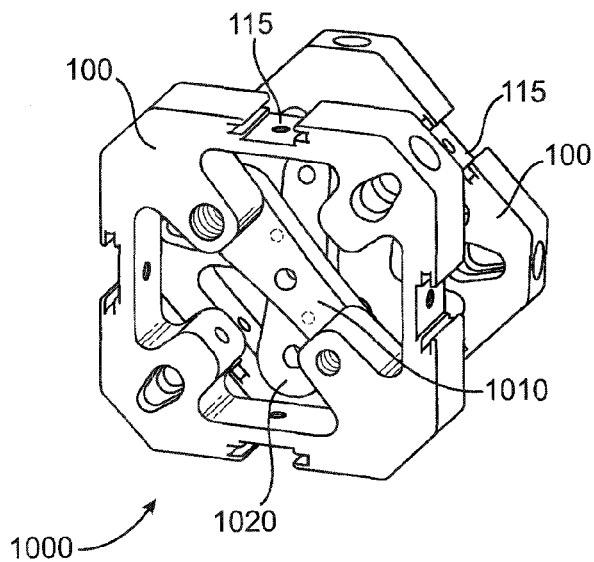
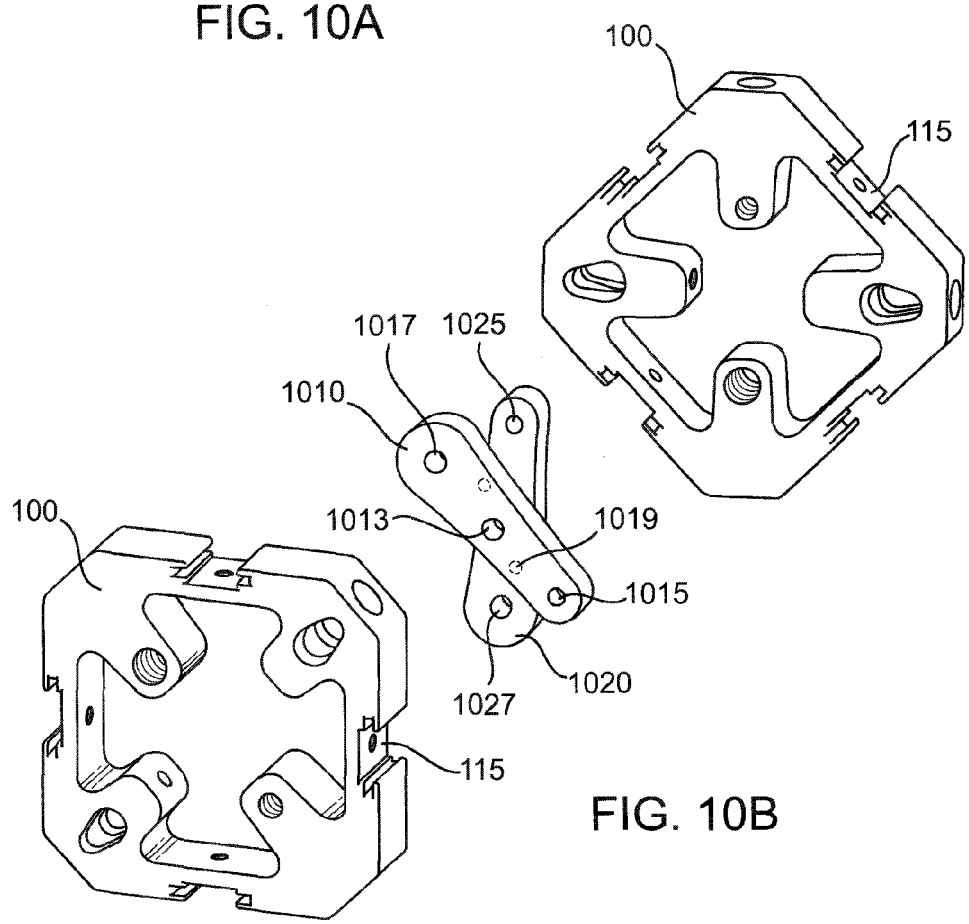
FIG. 10A
FIG. 10B

MOUNTING SYSTEM FOR ATTACHING MULTIPLE LIGHT SOURCES FOR PHOTOGRAPHIC USE

RELATED APPLICATIONS

This application claims benefit of priority to U.S. Provisional Patent Application No. 61/099,448, entitled "Mounting System for Attaching Multiple Light Sources for Photographic Use", filed on Sep. 23, 2008. The aforementioned priority application is hereby incorporated by reference in its entirety.

TECHNICAL FIELD

The present disclosure is generally relates to the field of photography.

BACKGROUND

A photographer may use any number of lighting techniques when photographing an item or subject. Typically, a light source is directed either directly or indirectly at the subject or item. One commonly used lighting accessory is a speedring. The speedring acts as an interface between a light source and other lighting accessories such as umbrellas, Soft boxes, tripods, monopods etc. The light source may be coupled to the speedring and directed at various angles and/or points of a Soft box or other lighting accessory. The light from the light source may reflect off or pass through the lighting accessory to achieve a desired lighting effect.

However, use of a speedring and light source combination may limit the lighting techniques used by a photographer as each speedring may typically be coupled to only one light source. Additionally, the sizes of the speedrings and light sources may not be universal. Thus, one brand of light source may not fit a different manufacturers' speedring. Still yet another disadvantage of using speedrings is that the speedring and the associated light source are typically bulky and may take up significant storage space.

BRIEF DESCRIPTION OF THE DRAWINGS

FIG. 10A shows a double mounting plate configuration according to embodiments.

FIG. 10B shows an exploded isometric view of the double mounting plate configuration of FIG. 10A according to embodiments.

DETAILED DESCRIPTION

Figure 1A:
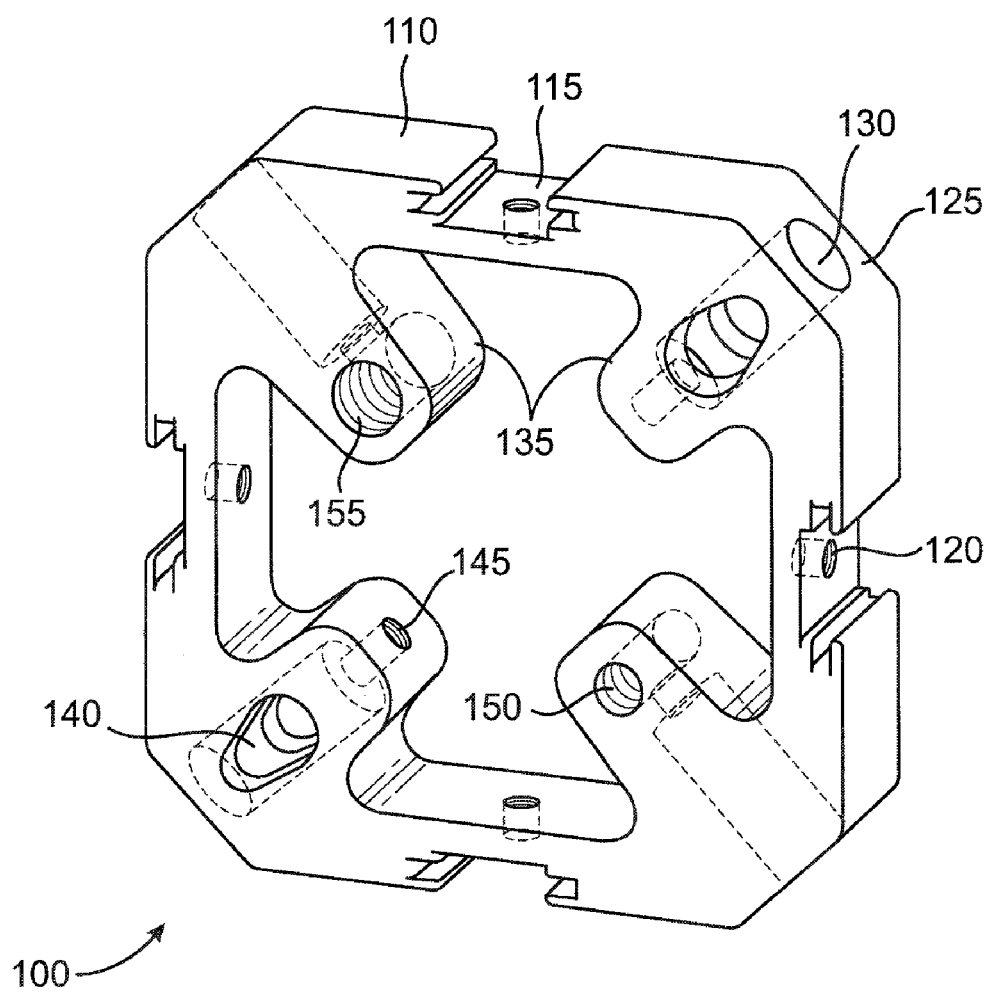
FIG. 1A is an isometric view of a mounting plate according to embodiments.

This disclosure will now more fully describe exemplary embodiments with reference to the accompanying drawings, in which specific embodiments are shown. Other aspects may be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements are shown throughout are indicated with like reference numerals.

TERMINOLOGY

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

The term "speedlight" means any light source, flash unit and the like with a hot shoe that may be used to illuminate an object or subject. Such light sources may include flash, tungsten, light emitting diodes (LEDs), hydrargyrum medium-arc iodide (HDI), halogen, incandescent, and fluorescent. Specific examples include a Nikon Speedlight SB-800 and a Canon Speedlight 580 etc.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

Described herein is a mounting plate having a plurality of exterior edges. Each edge of the mounting plate has a mounting interface. Between each of the exterior edges is a flattened corner. Each of the planar corners has a pole mount disposed therein. The mounting plate also has a plurality of interior projections, each of the plurality of interior projections being disposed on an inner side of each of the planar corners. At least one of the plurality of interior projections has a stand mount disposed therein and at least a second one of the plurality of interior projections has an umbrella mount disposed therein.

Other embodiments provide a mounting plate for a plurality of camera light sources. The mounting plate includes a cold shoe mount disposed on each exterior side of the mounting plate. Each cold shoe mount of the mounting plate is configured to receive and secure a light source. A plurality of planar corner edges are disposed between each outer side of the mounting plate and each corner edge has a pole mount disposed therein. Each inner side of each of the corners has an interior projection disposed thereon. At least one of the interior projections has an umbrella mount disposed thereon and at least a second one of the interior projections has a stand mount disposed thereon.

Still yet other embodiments provide a mounting plate having a first side having a first mount disposed thereon, a second side having a second mount disposed thereon, a third side having a third mount disposed thereon, and a fourth side having a fourth mount disposed thereon. A plurality of corners are disposed between each of the first, second, third and fourth sides of the mount which form the mount into a generally square shape. Each of the corners has a receptacle disposed therein. A first set of interior projections are coupled to inner portions of a first corner of the plurality of corners and a second corner of the plurality of corners respectively. A first interior projection of the first set of interior projections has a first threaded hole that has a first diameter and a second interior projection of the first set of interior projections has a second threaded hole that has a second diameter disposed therein. A second set of interior projections are coupled to inner portions of a third corner and a fourth corner respectively. The first interior projection of the second set of interior projections has a first umbrella mount and a second interior projection of the second set of interior projections has a second umbrella mount. The mounting plate also includes first and second threaded bores that are disposed on a central axis of an inner side of each of the second set of interior projections.

FIG. 1A is an isometric view of a mounting plate 100 according to embodiments. The mounting plate 100 is preferably made of a sufficiently rigid and strong material such as a high strength plastic, metal, metal alloy, or other suitable material. In an embodiment, the mounting plate is made of 6061 Aluminum. According to embodiments the mounting plate 100 is approximately 3.5 inches by 0.75 inches. The mounting plate 100 has a plurality cold shoe mounts disposed thereon. Each of the cold shoe mounts has standard cold shoe mount dimensions and are configured to receive a stand hot shoe mount.

The mounting plate 100 has four sides 110 and is generally square in shape. Each of the exterior sides of the mounting plate 100 has a mounting interface 115 (e.g. cold shoe mount) disposed thereon. The mounting interface 115 is configured to receive and secure a standard accessory shoe, or hot shoe, of a speedlight. The accessory shoe is commonly found on prosumer and professional camera flashes and other light sources. Typically, accessory shoes allow external flashes and other photographic devices to interconnect with other photographic devices, such as cameras. Other embodiments provide that the mounting interface 115 may be used to mount the mounting plate 100 to a stand, tripod, monopod, extendable handle and the like. Although a specific shape for the mounting interface 115 is shown in the figures and described herein, it is contemplated that other interconnection mechanisms may be used, such as for example, clamps, snap fit locks, threading or other such securing means.

Each mounting interface 115 has a threaded bore 120 disposed on a center axis of the mounting interface 115. The threaded bore 120 can be a 10/32 size bore, although other sizes are contemplated. The threaded bore 120 is configured to receive a screw or other securing means that may be used to secure a speedlight when the slight has been inserted into the mounting interface 115. As will be explained in greater detail below, a mounting accessory may also be placed in the mounting interface 115 and secured by a screw or other securing mechanism.

A planar corner 125 is disposed between each of a first side 110 and a second side 110, the second side 110 and a third side 110, the third side 110 and a fourth side 110 and the fourth side 110 and the first side 110 of the mounting plate 100. Each planar corner 125 has a pole mount 130 disposed therein. As will be described in greater detail below, the pole mount 130 is configured to receive a pole of a Soft box or extension shaft. The pole mount 130 opens, at least partially, into an umbrella mount 140 disposed on at least one interior projection 135 according to embodiments. The pole mount 130 receives a pole of a Soft box or extension shaft and securely holds it within the interior projection 135 of the mounting plate 100. In embodiments the inner surface of the pole mount 130 is smooth to enable an extension shaft or pole to slide in and out with relative ease. Other embodiments provide that the pole mount 130 may be threaded so as to receive a threaded extension shaft or threaded pole.

The interior of the mounting plate 100 has a plurality of interior projections 135. The interior projections 135 are disposed opposite the planar surface of each of the planar corners 125. As shown in FIG. 1A, two of the interior projections 135 may have a first size while the two remaining interior projections 135 may have a second, larger size. The larger of the interior projections 135 may each have an umbrella mount 140 disposed thereon. The smaller interior projections 135 may have different sized stand mounts 150 and 155 disposed thereon. It is contemplated that the interior projections and the mounts disposed thereon may be arranged in any number of configurations and have a variety of sizes with respect to each other.

According to embodiments, an umbrella mount 140 is disposed on a planar surface of at least two of the four interior projections 135. According to embodiments, both umbrella mounts 140 may be located on opposite interior projections 135 as shown in FIG. 1A. Other embodiments provide that the umbrella mounts 140 may be disposed on any or all of interior projections 135 in any configuration. Additionally, it is contemplated that an umbrella mount may be disposed on only one or even none of the interior projection 135.

Each umbrella mount 140 is generally tear shaped. Such a configuration enables each of the umbrella mounts 140 to receive a typical tear shaped locking spring located on photography umbrellas. However, it is contemplated that round shafts of umbrellas and other accessories may also be inserted and secured in each umbrella mount 140. The interconnection of the mounting plate 100 umbrella mount 140 and a shaft of an umbrella, such as, for example, umbrella shaft 245 and umbrella shaft 235 (FIG. 2), can be tightened using screws, such as screw 147 (FIG. 1B) or other securing means that may inserted into threaded bores 145. The threaded bores 145 are 10/32 sized bores, although other sizes may be used. According to embodiments, the threaded bores 145 are disposed on innermost portions of each of the interior projections 135 on which umbrella mounts 140 are located.

The interior projections 135 may also have means for mounting standard stand adapters. According to embodiments, a first stand mount 150 is located on a first interior projection 135 and a second stand mount 155 is located on a second interior projection 135 that is opposite the first interior projection 135 on which the first stand mount 150 is located. Other embodiments provide that additional stand mounts having different diameters may be disposed on any and/or all of the interior projections 135 in any arrangement.

The first stand mount 150 is threaded and may be configured to receive a standard 1/4-20 stand adapter. The second stand mount 155 is also threaded and is sized to receive a standard 3/8-18 stand adapter. Moreover, even though the stand mounts 150 and 155 are shown on opposing sides of FIG. 1A, the stand mounts 150 and 155 may also be located adjacent to each other or may be positioned in any other desired configuration. The stand adapters may be screwed into the stand mounts 150 and 155 interconnect a monopod or tripod stand adapter to the mounting plate 100.

Figure 1B:
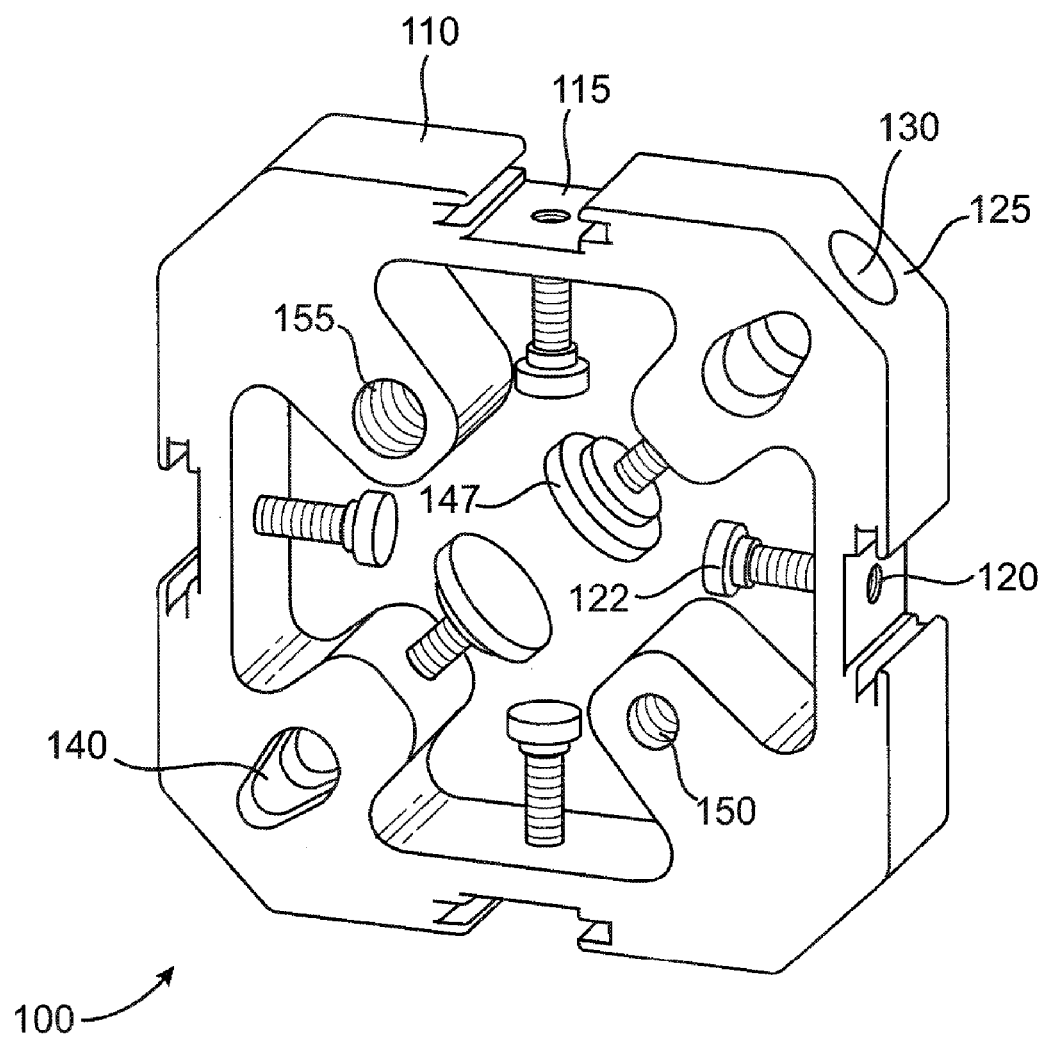
FIG. 1B is an isometric view of a mounting plate having a plurality of screws according to embodiments.

FIG. 1B is an isometric view of a mounting plate 100 having a plurality of screws according to embodiments. As explained above, the mounting plate 100 has four sides 110. A mounting interface 115 is disposed on each exterior side of each of the four sides 110. A threaded bore (e.g., threaded bore 120 FIG. 1A) is disposed on a central axis of each mounting interface 115. Each threaded bore 120 is configured to receive a threaded screw 120. The threaded screw 120 can be used to tighten and securely hold a shoe of a speedlight or other mounting accessory that has been selectively interconnected with the each mounting interface 115.

Umbrella mount screws 147 may be inserted into a plurality of threaded bores (e.g. threaded bores 145 FIG. 1A) and used to secure a shaft of an umbrella, such as for example, umbrella shaft 235 and umbrella shaft 245 (FIG. 2) and/or shafts of other commonly used lighting fixtures or instruments. When the shafts are inserted, the shaft may slideably move through the umbrella mount 140 until the screw 147 has been tightened. Once the screw 147 has been tightened, the shaft of an umbrella is virtually unmovable. When the screw 147 is loosened, the shaft may freely slide through the umbrella mount 140.

FIGS. 2-12 illustrate various aspects and features of a mounting plate 100 including a number of mounting accessories disposed thereon according to embodiments. FIGS. 2-12 also show components that were first described with respect to FIGS. 1A and 1B and therefore the description of FIGS. 2-12 may refer to at least one component described in FIG. 1A and/or FIG. 1B. However, any references to components of FIG. 1A and/or FIG. 1B are for descriptive purposes only.

Figure 2:
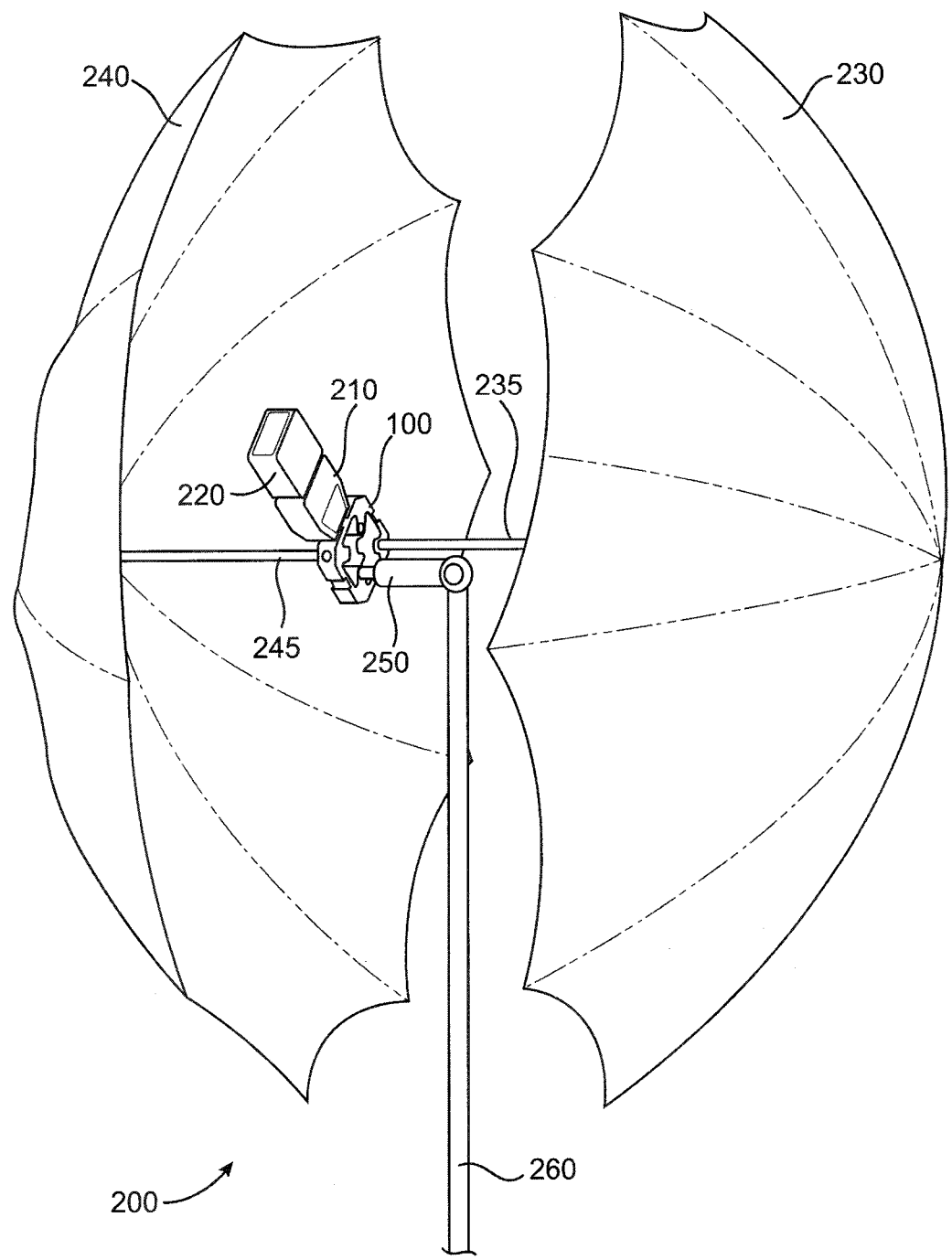
FIG. 2 shows a mounting plate in a double bounce configuration having a plurality of umbrellas interconnected with the mounting plate according to embodiments.

FIG. 2 shows a mounting plate 100 (FIG. 1A) in a double bounce configuration 200 having a plurality of umbrellas 230 and 240 interconnected with the mounting plate 100 according to embodiments. An umbrella, such as umbrella 230 may be used in photography to provide and indirect bounce of a light produced from a light source, such as speedlight 210. This is accomplished by swiveling a swivelable head 220 of the speedlight 210 to direct a flash, or a constant light source, into an inner portion of umbrella 230. Alternatively, multiple umbrellas may be used to perform a "double bounce" in which light from a light source, such as speedlight 210 is reflected off an inner side of umbrella 230 and diffused through a second umbrella 240.

A shaft 235 of umbrella 230 can be inserted into one of the umbrella mounts, such as umbrella mount 140 of the mounting plate 100. The shaft 235 may be slideably moved within the umbrella mount 140 until the umbrella 230 is placed a desired distance away from the speedlight 210. When the desired distance is reached, a screw 147 is tightened to secure the umbrella 230 in place.

Likewise, a shaft 245 of a second umbrella 240 may be inserted into a second umbrella mount 140 disposed on the mounting plate 100. The second umbrella shaft 245 may be slideably moved within the umbrella mount 140 until the umbrella 240 is placed a desired distance away from the speedlight 210 and/or the first umbrella 230.

FIG. 2 also shows a stand 260 being coupled to the mounting plate 100 using a stand adapter 250. According to embodiments, the stand adapter 250 may be configured to fit within the first stand mount 150 (e.g., 1/4-20 threaded bore) or the second stand mount 155 (e.g., 3/8-18 threaded bore). Although a stand 260 is specifically shown and described, it is contemplated that any type of stand such as a monopod or tripod, handle, or other mounting device may be connected with either the first stand mount 150 or the second stand mount 155. It is also contemplated that the first stand mount 150 and/or the second stand mount 155 may have different sizes from the ones described herein. Furthermore, both the first stand mount 150 and the second stand mount 155 may have equivalent sizes.

Figure 3:
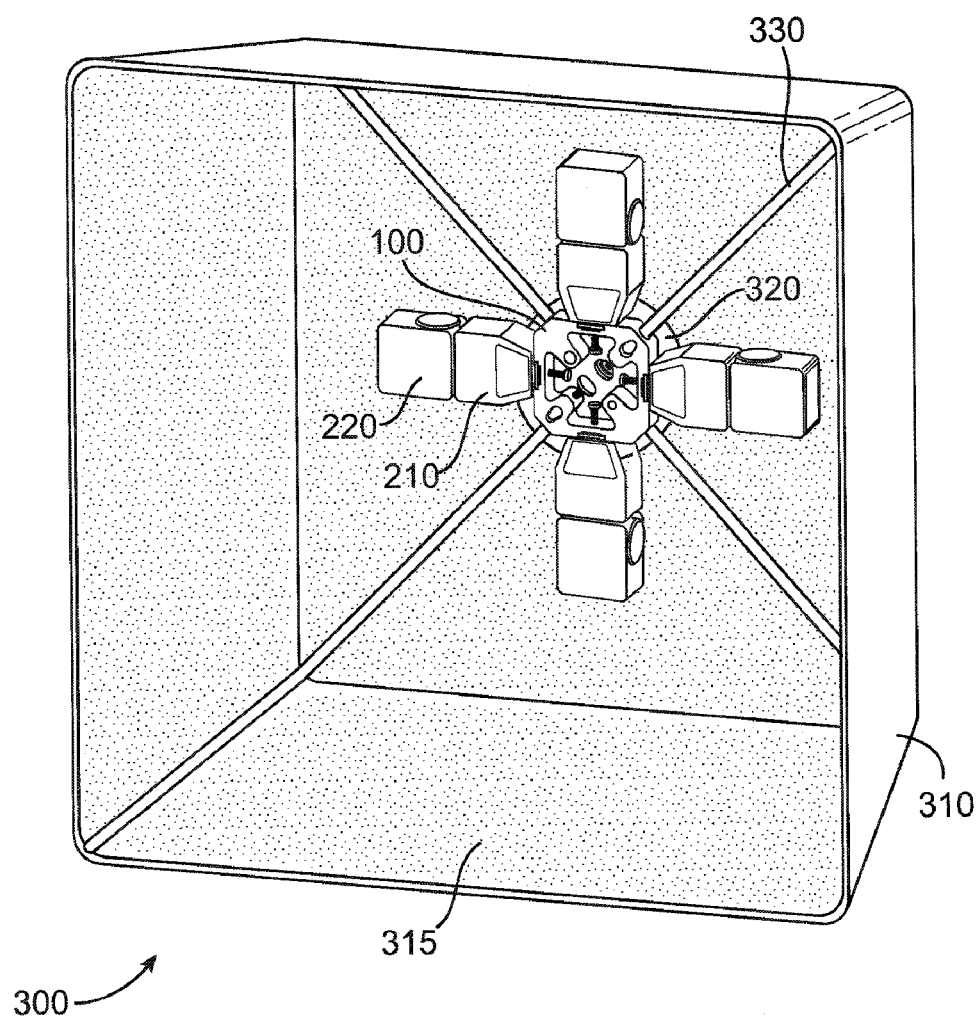
FIG. 3 shows a mounting in a Soft box configuration according to embodiments.

FIG. 3 shows a mounting plate 100 in a Soft box configuration 300 according to embodiments. A Soft box, such as Soft box 310, is a box that fits over a light source, such as a speedlight 210. Typically, a Soft box has black sides with a white, gold, or silver interior 315 from which light is reflected. The reflected light may then pass though a translucent, or entirely open, portion of the Soft box. A Soft box is typically used to provide soft, even lighting conditions. Such conditions may be desirable in portrait photography as well as other types of commercial photography.

A Soft box 310 may be coupled to the mounting plate 100 using a plurality of Soft box poles 330. The Soft box poles 330 are inserted into each of the pole mounts 130 that are disposed on the planar corners 125 of the mounting plate 100. According to embodiments, the Soft box 310 has an opening 320 disposed on a back portion of the Soft box 310. The opening 320 may be used to enable a photographer to transmit an infrared (IR), radio signal, pulsing signal or any other signal from a camera or controller to an infrared (IR) receiver and the like disposed on a light source contained within the Soft box 310.

A plurality of speedlights 210, maybe interconnected to the mounting plate 100 while still being contained within the Soft Box 310 as shown in FIG. 3. Such a configuration enables the swivelable heads 220 of each of the speedlights 210 to be pointed in different directions within the Soft box 310. This configuration enable a photographer to better control the lighting conditions of photograph as the multiple light sources may be placed in any number of different configurations. For example, two of the swivelable heads 220 of the speedlights 210 may be pointed at opposite inner corners of the Soft box 310 while the remaining two swivelable heads 220 of the remaining speedlights 210 may be pointed at opposite inner sides of the Soft box 310. Although a Soft box 310 is shown using a single mounting plate 100 and having four speedlights 210 interconnected therewith, it is contemplated that multiple mounting plates 100 may be coupled together and additional speedlights may be interconnected therewith and placed within the Soft box 310.

Figure 4:
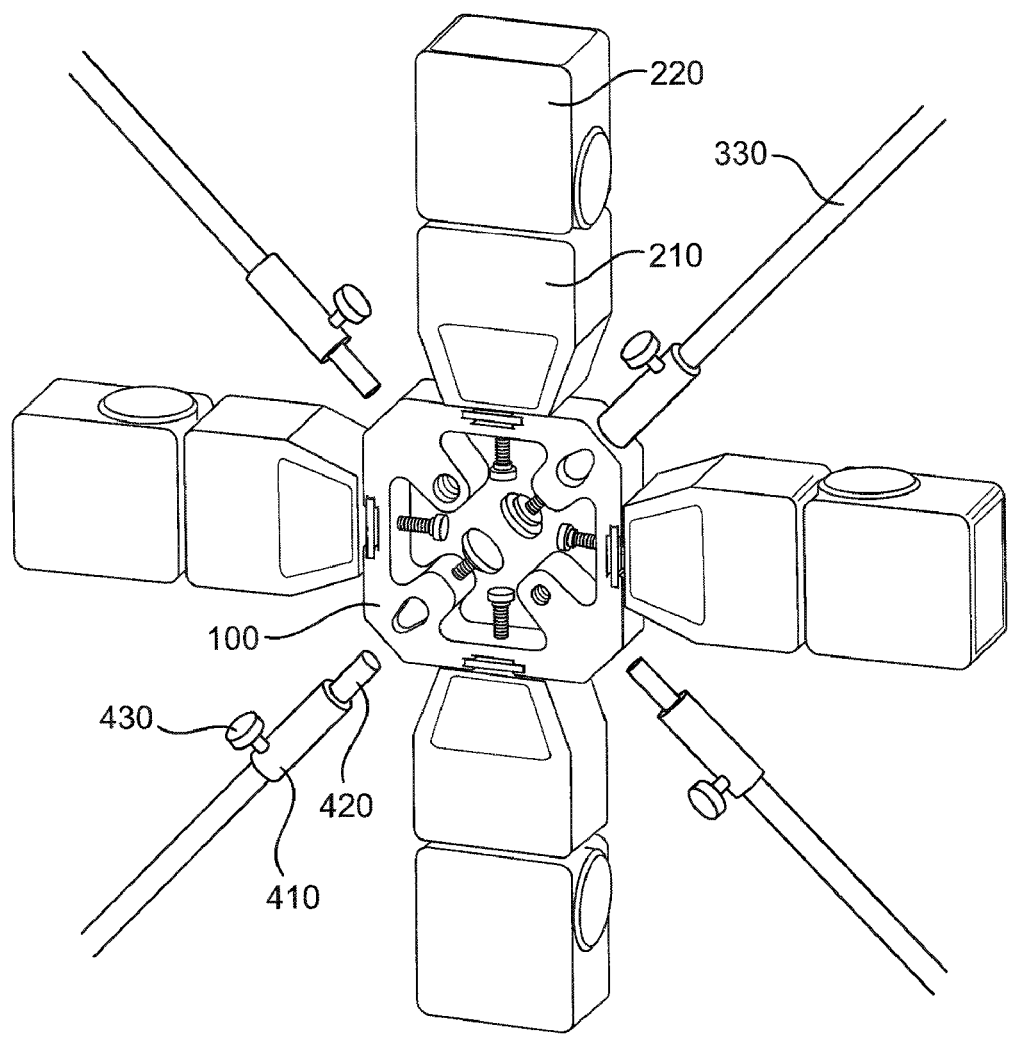
FIG. 4 shows a mounting plate having a plurality of extension shafts disposed therein according to embodiments.

FIG. 4 shows a mounting plate 100 having a plurality of extension shafts 410 disposed thereon according to embodiments. The extension shafts 410 may be used to interconnect poles of a Soft box that were not originally designed to reach and/or fit within the pole mounts 130 of the mounting plate 100 of the present disclosure.

The extension shafts 410 include a threaded bore disposed on a top portion of the extension shaft 410. A threaded screw 430 may be inserted into the bore to secure a pole that has been inserted into the extension shaft 410. An extension plug 420 is disposed on a lower portion of the extension shaft 410.

Embodiments provide that the top portion of the extension shaft 410 is hollow while the extension plug 420 is solid. The extension plug 420 is configured to fit within each pole mount 130 disposed on each planar corner 125 of the mounting plate 100. The hollow portion of the extension shaft 410 is configured to receive and secure Soft box pole, such as Soft box pole 330 within the extension shaft 410.

According to embodiments, the hollow portion of the extension shaft 410 has a diameter substantially equivalent to the diameter of each of the pole mounts 130. Other embodiments provide that the hollow portion of the extension shaft may be greater than the diameter of the pole mounts 130. Likewise, the extension plug 420 has a diameter that is substantially equivalent to the diameter of the hollow portion of the extension shaft 410 and/or each of the pole mounts 130.

Figure 5A:
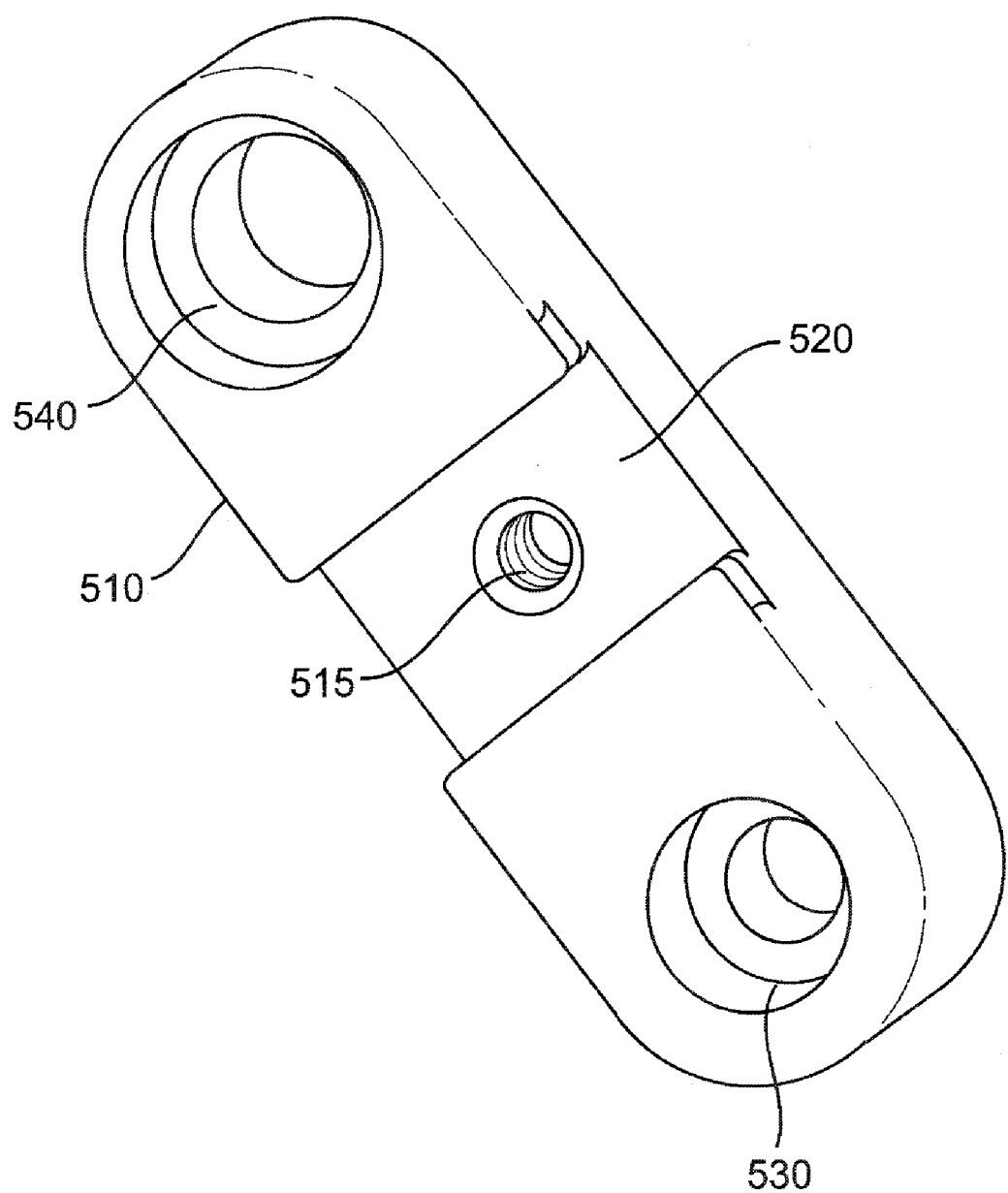
FIG. 5A is an isometric view of a center piece extension accessory according to embodiments.

FIG. 5A is an isometric view of a center piece extension 510 according to embodiments. The center piece extension 510 has a center piece mounting interface 520 disposed on a center axis of the center piece extension 510. According to embodiments, the center piece mounting interface 520 includes a threaded bore 515 disposed on a central axis of the center piece mounting interface 520. The center piece mounting interface 520 is configured to receive and secure a shoe of a speedlight to the centerpiece extension 510. A screw, such as for example, screw 122 (FIG. 1B) or other securing means may be used to secure the speedlight to the center piece extension 510.

The center piece extension 510 also includes a first bore 530 and a second bore 540. According to embodiments, the first bore 530 has a first diameter and is configured to align with the first stand mount 150 (FIG. 1A). The second bore 540 has a second diameter, that is larger than the first diameter, and is configured to align with the second stand mount 155 (FIG. 1A).

Figure 5B:
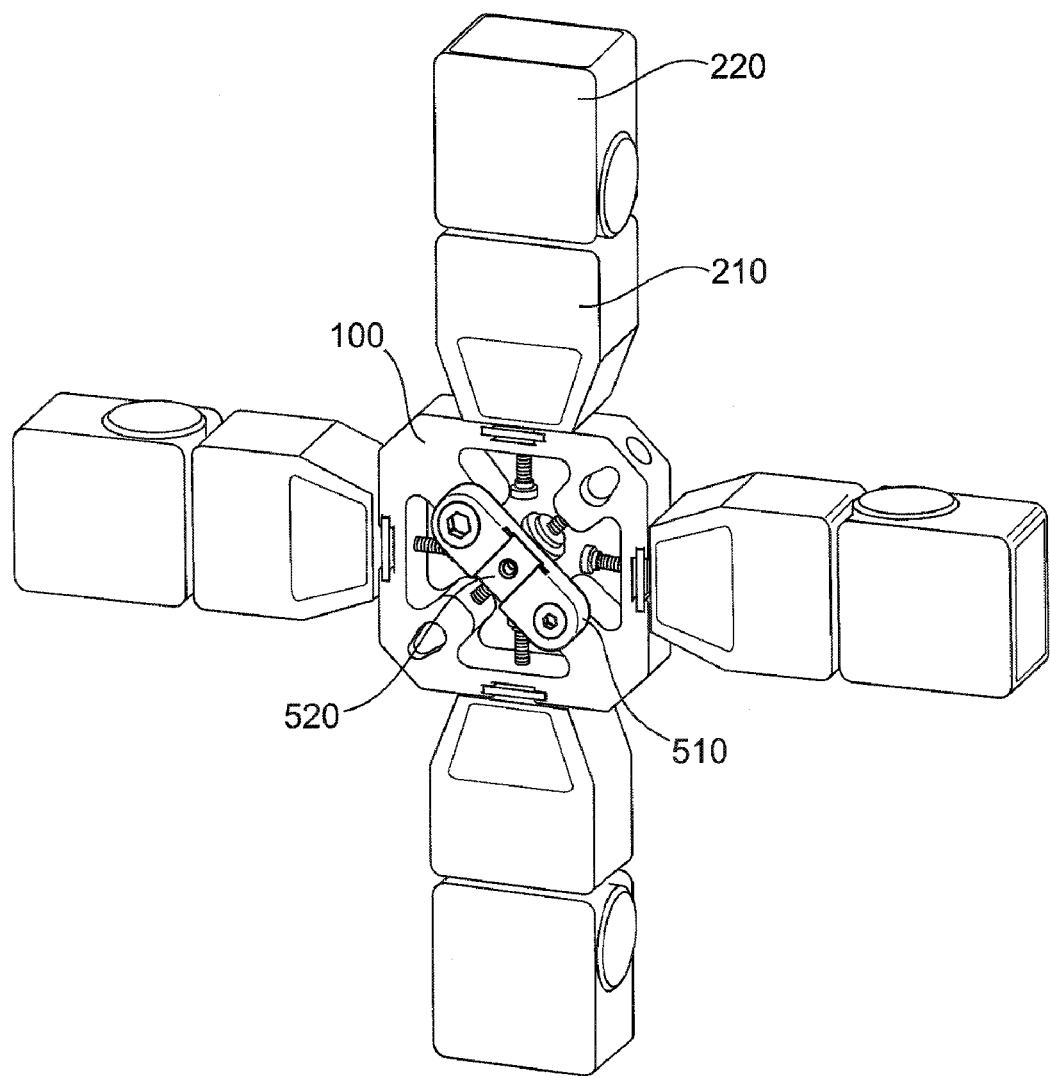
FIG. 5B shows a mounting plate having the center piece extension accessory of FIG. 5A disposed thereon.

FIG. 5B shows a mounting plate 100 having the center piece extension 510 of FIG. 5A disposed thereon. As shown in FIG. 5B, the center piece extension 510 can be coupled to a plurality of interior projections, such as interior projections 135, of the mounting plate 100. As stated above, the first bore 530 is aligned with the first stand mount 150 and the second bore 540 is aligned with the second stand mount 155. The center piece extension 510 is secured to the mounting plate 100 using a plurality of threaded bolts or screws. According to embodiments, a 1/4-20 screw or bolt secures the first bore 530 to the first stand mount 150 and a 3/8-18 screw or bolt secures the second bore 540 to the second stand mount 155. Although screws and/or bolts may be used to secure the center piece extension 510 to the mounting plate 100, a standard stand adapter, such as stand adapter 250 (FIG. 2) may also be simultaneously coupled to the mounting plate 100.

When the center piece extension 510 is coupled to the mounting plate 100 as shown in FIG. 5B, up to five speedlights or other lights sources may be interconnected to the assembly. For example, a speedlight may be interconnected to each of the four mounting interfaces 115 of the mounting plate 100 and an additional speedlight may be interconnected to the center piece mounting interface 520.

Figure 6:
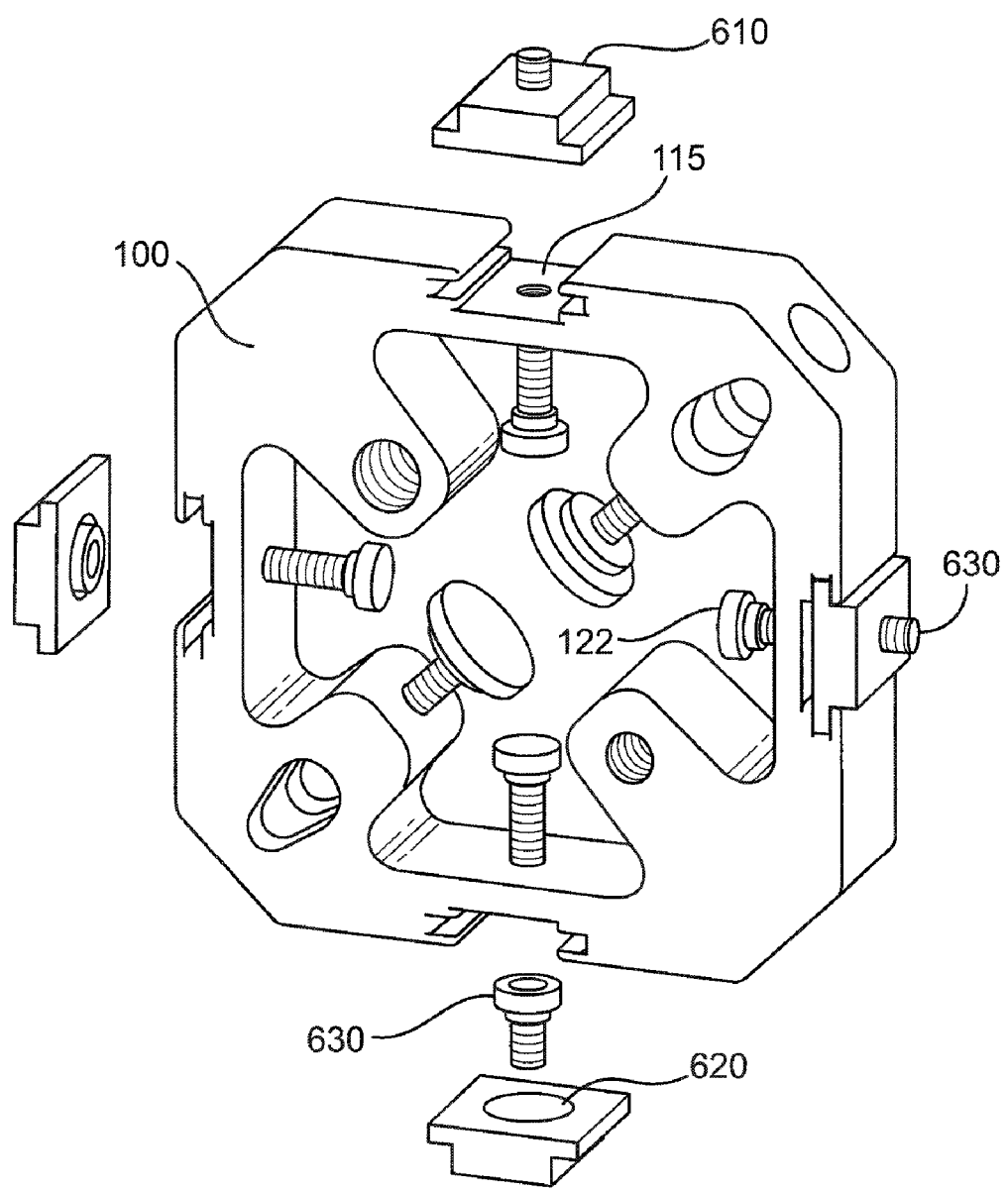
FIG. 6 shows a mounting plate having a plurality of strobe mounts selectively interconnected therewith according to embodiments.

FIG. 6 shows a mounting plate 100 having a plurality of strobe mounts 610 selectively interconnected therewith according to embodiments. The strobe mounts 610 can be used to attach light sources, for example strobe lights, that do not have a standard shoe mount. The strobe mount 610 has a bore 620 disposed on a central axis. The bore 620 is configured to entirely contain a head of a bolt 630 while permitting a threaded shaft of the bolt 630 to extend out of a top planar side of the strobe mount 610.

Embodiments provide that a base of the strobe mount 610 is configured to be interconnected with a mounting interface 115 of the mounting plate 100. A screw, such as screw 122 (FIG. 1A) may be used to secure the strobe mount 610 to the mounting interface 115. In embodiments, the head of the bolt 630 is configured to receive at least a portion of a threaded shaft of the screw 122. When the strobe mount 610 has been secured, a strobe light or other light source having a bore with female threads may be secured to the threaded portion of the bolt 630.

Figure 7:
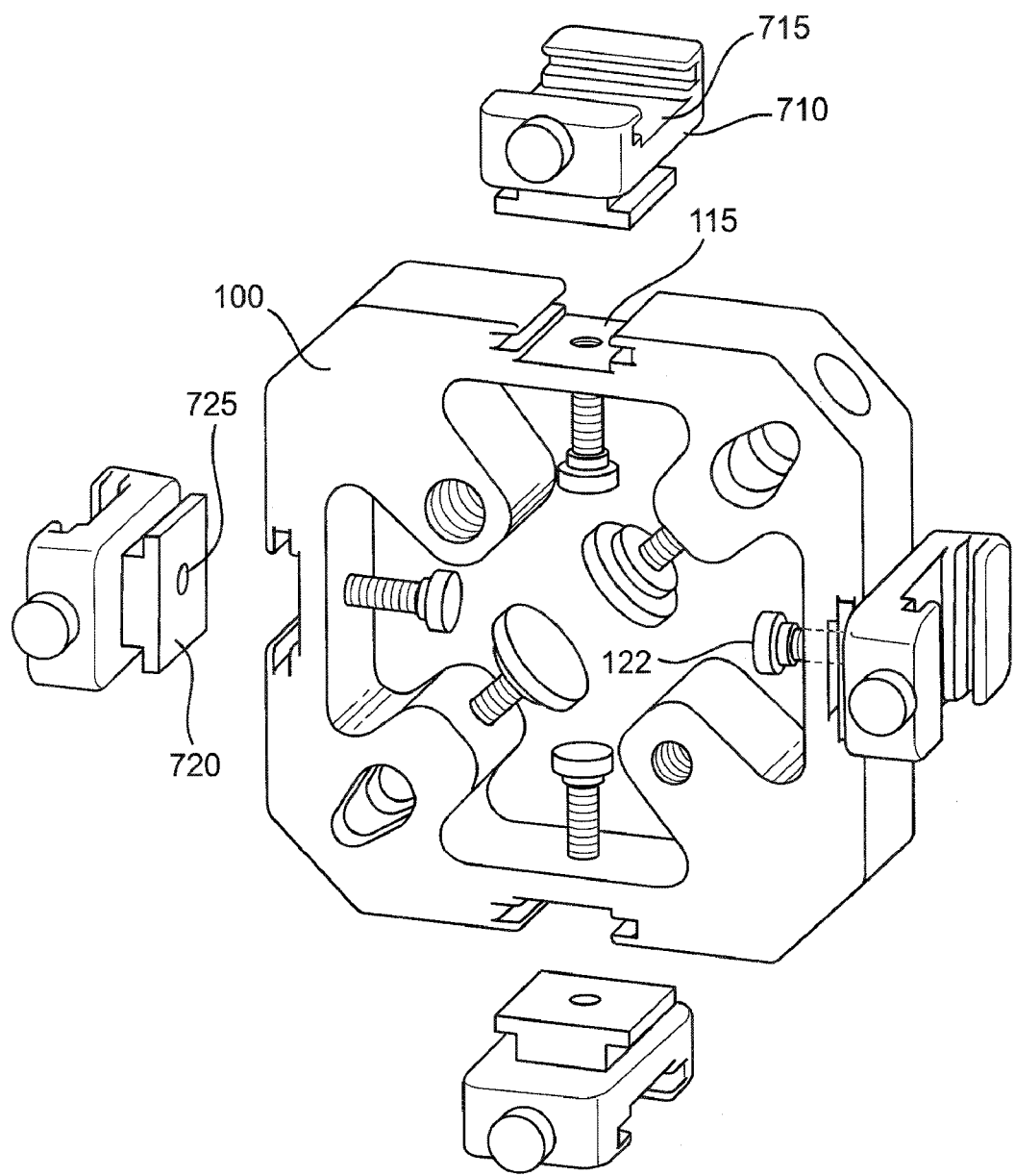
FIG. 7 shows a mounting plate having a plurality of ninety-degree mounts selectively interconnected therewith according to embodiments.

FIG. 7 shows a mounting plate 100 having a plurality of ninety-degree mounts 710 selectively interconnected therewith according to embodiments. The ninety-degree mounts 710 can be used to attach a base portion of a speedlight at a ninety-degree angle with respect to the mounting plate 100. Such a configuration may be useful when a photographer wants to position an infrared (IR), radio or other such receiver of a speedlight in a desired position (e.g., through the back opening of a Soft box, such as opening 320 of the Soft box 310 (FIG. 3)).

The ninety-degree mount 710 has a base portion 720 configured to be interconnected with a mounting interface 115 of the mounting plate 100. The base portion 720 includes a receptacle 725 configured to receive at least a threaded portion of a screw, such as screw 122 (FIG. 1A), which may be used to secure the ninety-degree mount 710 to the mounting interface 115.

A ninety-degree mounting interface 715 is included on an upper portion of the ninety-degree mount 710. The ninety-degree mounting interface 715 is configured to receive and secure a shoe of a speedlight while holding the base of the speedlight at a ninety-degree angle with respect to the mounting plate 100.

The ninety-degree mount 710 also includes a threaded bore on an upper portion of the mount. The threaded bore is configured to receive a threaded screw 730, that when tightened, secures a speedlight to the ninety-degree mounting interface 715.

Figure 8:
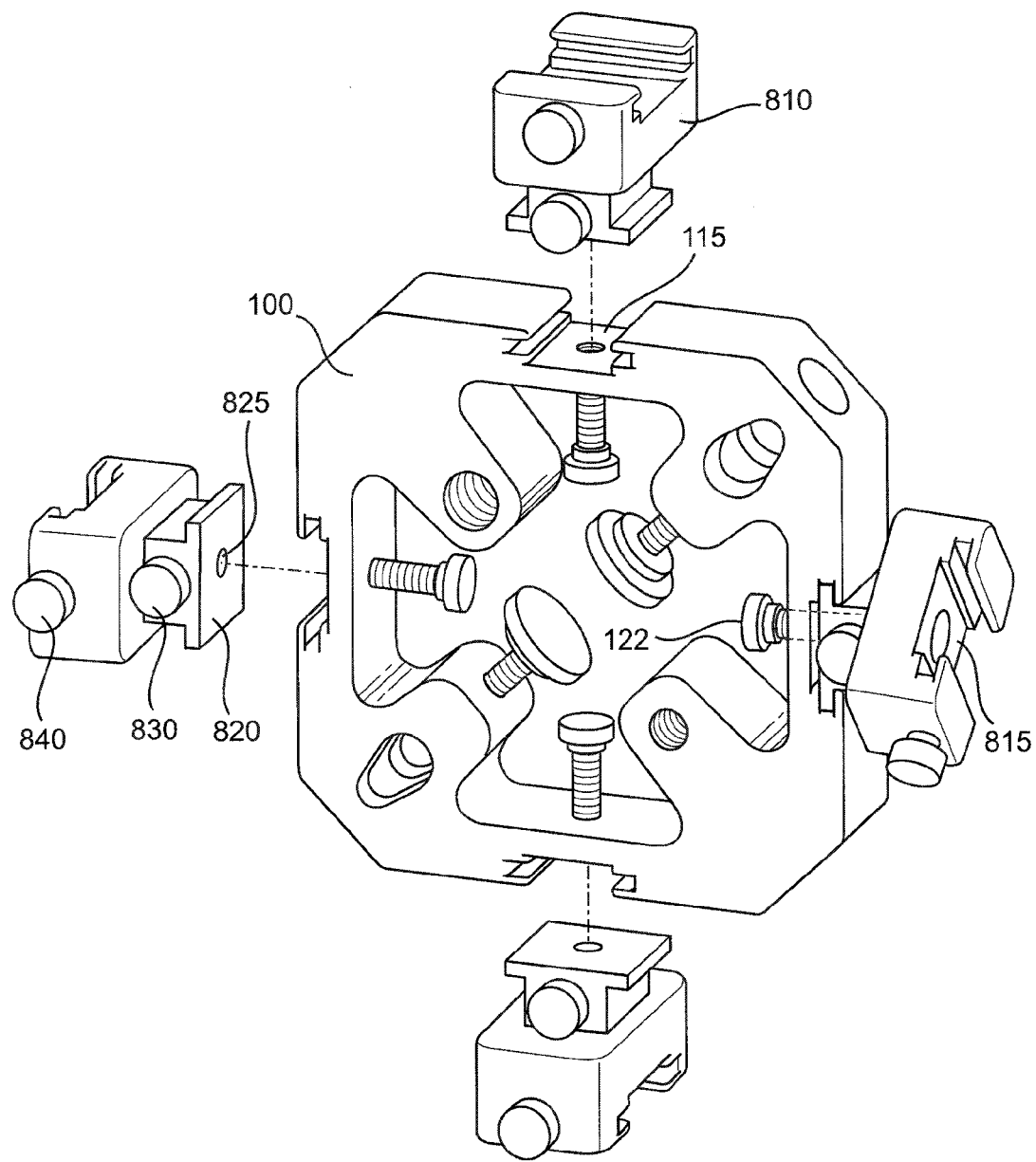
FIG. 8 shows a mounting plate having a plurality of swivel mounts selectively interconnected therewith according to embodiments.

FIG. 8 shows a mounting plate 100 having a plurality of swivel mounts 810 selectively interconnected therewith according to embodiments. A swivel mount 810 may be selectively interconnected with a mounting interface 115 of the mounting plate 100. Use of a swivel mount 810 enables a base of speedlight, such as speedlight 210 (FIG. 2), to be swiveled 360 degrees with respect to the mounting plate 100 and secured at any angle therein.

The swivel mount 810 includes a top portion having a swivel mount mounting interface 815. The swivel mount mounting interface 815 is configured to interconnect a hot shoe of a speedlight or other connection mechanism of another light source to the swivel mount 810. Embodiments provide that the top portion of the swivel mount 810 may be removed from a bottom portion 820. Once removed, the top portion may be secured to a stand, such as a monopod or tripod via a threaded bore disposed on a central axis of the swivel mount mounting interface 815.

A threaded bore is disposed on at least one side of the top portion of the swivel mount 810 and is configured to receive a screw 840. The screw 840 may be tightened to secure the speedlight to the swivel mount mounting interface 815.

Swivel mount 810 also includes a base portion 820 that is configured to couple the swivel mount 810 to the mounting interface 115 of the mounting plate 100. Embodiments provide that the base portion 820 is similar to the strobe mount 610 described above. In such embodiments, when the base portion 820 of the swivel mount 810 has been removed, the base portion may be used in a similar fashion as the strobe mounts of FIG. 6 described above. The base portion 820 also includes a receptacle 825. The receptacle is configured to receive at least a threaded portion of a screw, such as screw 122 (FIG. 1A), which may be used to secure the swivel mount 810 to the mounting interface 115 of the mounting plate 100.

The base portion 820 of the swivel mount 810 also includes a threaded bore disposed on at least one side of the bottom portion 820. The threaded bore is configured to receive a screw 830. When tightened, the screw 830 secures the top, swivelable portion, at a desired angle.

Figure 9A:
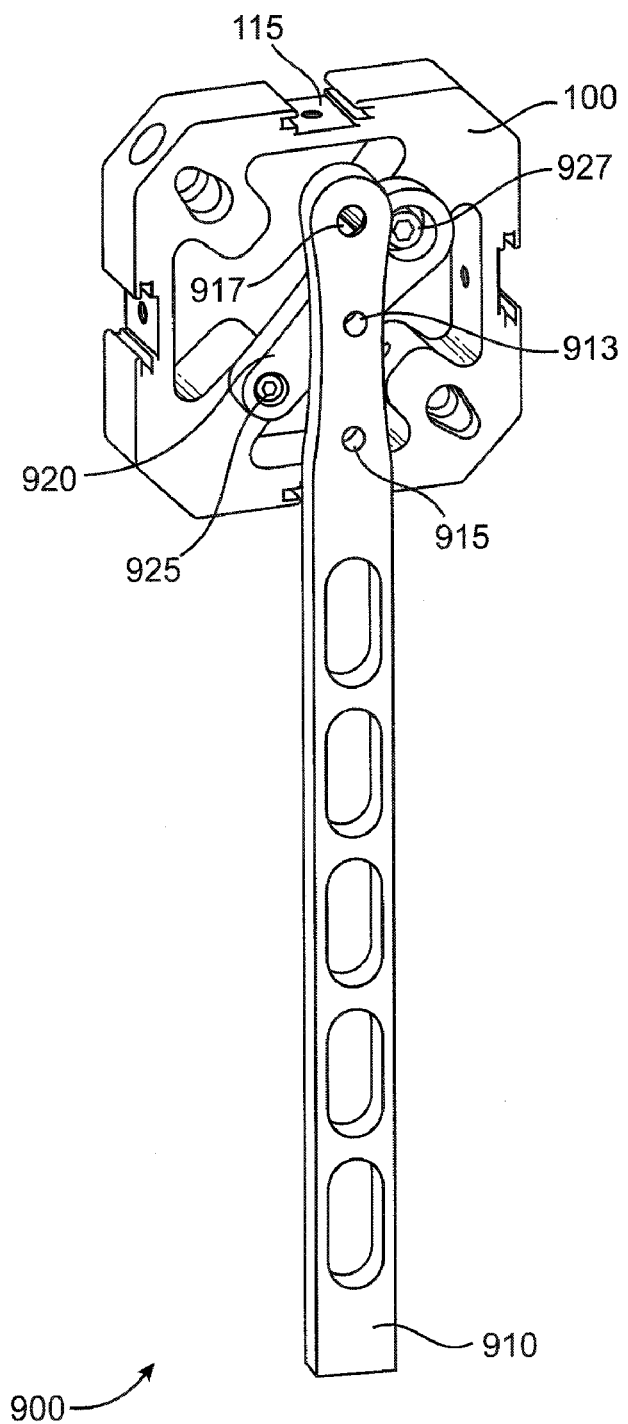
FIG. 9A shows a mounting plate in a handle configuration according to embodiments.

FIG. 9A shows a mounting plate 100 in a handle configuration 900 according to embodiments. The handle configuration 900 enables a photographer to selectively interconnect a speedlight to each mounting assemblies 115 of the mounting plate 100. The handle configuration 900 may enable a photographer to more easily carry and position light sources at various heights and angles.

The handle configuration 900 includes a handle 910 that may be securely coupled to a mounting plate 100. The handle 910 includes a first bore 915 having a first diameter and a second bore 917 having a second diameter. Embodiments provide that the first bore 915 is configured to align with a first stand mount 150 (FIG. 1A) of the mounting plate 100. Likewise, the second bore 917 is configured to align with a second stand mount 155 (FIG. 1A) of the mounting plate 100. When the bores are aligned, the mounting plate 100 may be secured to the handle 910.

According to embodiments, the handle 910 may also include a threaded bore (not shown) disposed a center axis of a bottom planar end of the handle 910. The threaded bore may be configured to secure an extension piece, a stand, monopod, a padded grip etc., to the handle 910.

The handle 910 may also include a cross-piece bore 913. According to embodiments, the cross-piece bore 913 is configured to secure a cross-piece 920 to the handle 910 using a threaded screw or threaded bolt. The cross-piece 920 also includes a cross-piece bore 923 (FIG. 9B) that is configured to receive a threaded portion of the threaded bolt or threaded screw that is inserted into the cross-piece bore 913.

Embodiments provide that a first cross-piece bore 925, having a first diameter, and a second cross-piece bore 927, having a second, larger diameter, are disposed on the cross-piece 920. The first cross-piece bore 925 is configured to align with a first stand mount 150 (FIG. 1A) of the mounting plate 100. Likewise, the second cross-piece bore 927 is configured to align with a second stand mount 155 (FIG. 1A) of the mounting plate 100.

Figure 9B:
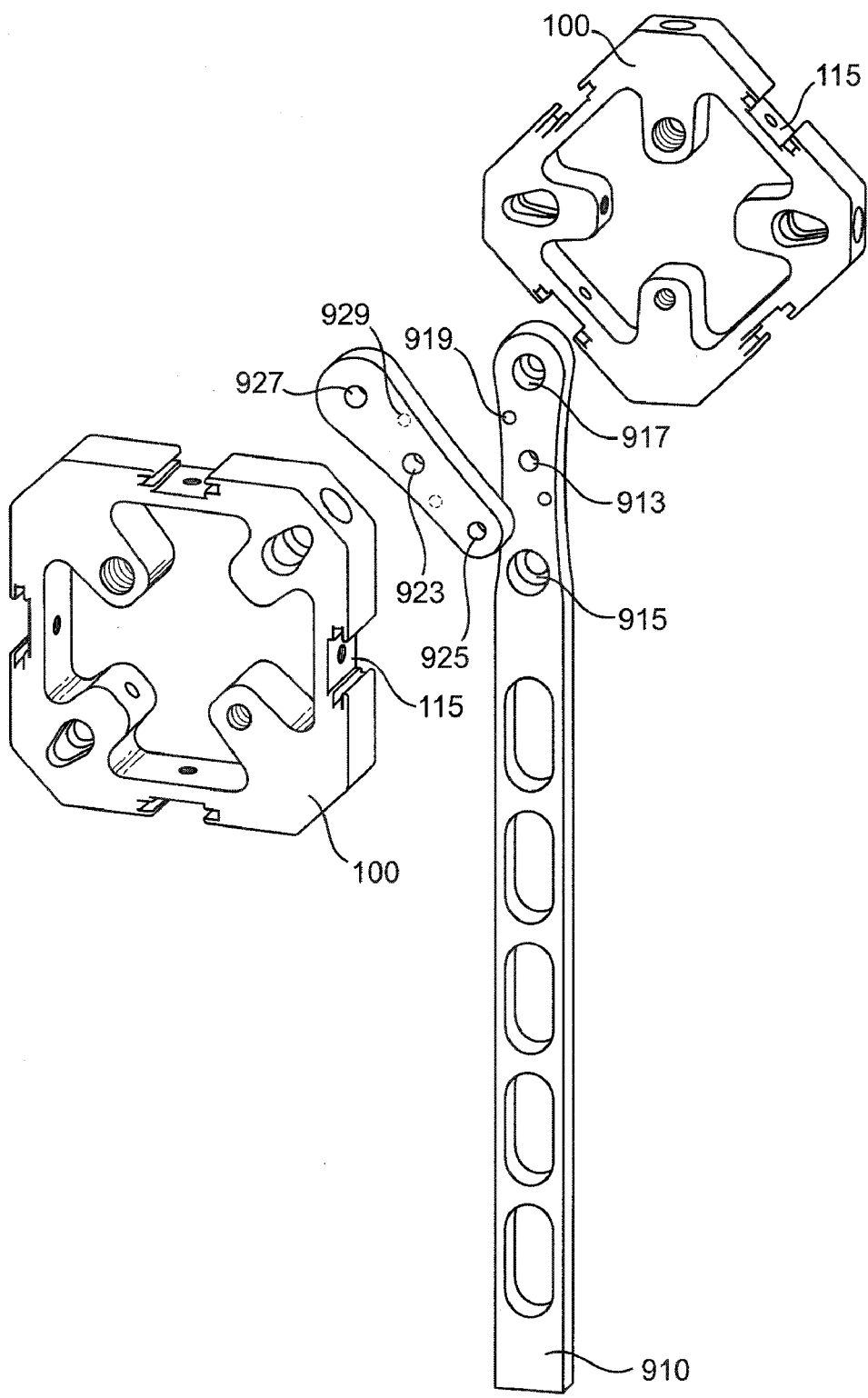
FIG. 9B shows an exploded isometric view of a plurality of mounting plates in a handle configuration according to embodiments.

FIG. 9B shows an exploded isometric view of a plurality of mounting plates 100 in a handle configuration 900 according to embodiments. The handle configuration 900 shown in FIG. 9B enables a photographer to selectively interconnect up to four light sources or speedlights to the mounting assemblies 115 on each of the mounting plates 100. Thus, up to eight speedlights may be interconnected to the handle 910.

The handle configuration 900 of FIG. 9B includes a handle 910 that may be securely coupled to a mounting plate 100. The handle 910 includes a first bore 915 having a first diameter and a second bore 917 having a second diameter. Embodiments provide that the first bore 915 is configured to align with a first stand mount 150 (FIG. 1A) of the mounting plate 100. Likewise, the second bore 917 is configured to align with a second stand mount 155 (FIG. 1A) of the mounting plate 100. When the bores are aligned, the mounting plate 100 is secured to the handle 910. In embodiments, when the mounting plate 100 is directly coupled to the handle 910, the mounting plate 100 may be rotated forty-five degrees with respect to a second mounting plate 100. Thus, the combination of mounting plates enable up to eight speedlights to be secured to the mounting plates every forty-five degrees.

As explained above, the cross-piece 920 includes a first cross-piece bore 925 having a first diameter and a second cross-piece bore 927 having a second, larger diameter. The first cross-piece bore 925 is configured to align with a first stand mount 150 (FIG. 1A) of the mounting plate 100. Likewise, the second cross-piece bore 927 is configured to align with a second stand mount 155 (FIG. 1A) of the mounting plate 100. The cross-piece 920 also includes a plurality of shafts 929 that protrude from a back planar side of the cross-piece. Each of the plurality of shafts 929 are configured to slideably mate with a plurality of receptacles 919 located on a planar side of the handle 910. A threaded screw or bolt may be inserted in cross-piece bore 913 and cross-piece bore 923 to secure the cross-piece 920 to the handle 910.

FIG. 10A shows a double mounting plate configuration 1000 according to embodiments. The double mounting plate configuration 1000 enables a photographer to selectively interconnect a plurality of speedlights the mounting assemblies 115 of each of the mounting plates 100. According to embodiments, up to eight speedlights may be interconnected to the double mounting plate configuration 1000. Further embodiments provide that a center piece extension 510 may be added to at least one of the mounting plates 100.

The double mounting plate configuration 1000 includes a first cross-piece section 1010 that may be securely coupled to a mounting plate 100. The first cross-piece section 1010 includes a first bore 1015 (FIG. 10B) having a first diameter and a second bore 1017 (FIG. 10B) having a second diameter. Embodiments provide that the first bore 1015 is configured to align with a first stand mount 150 (FIG. 1A) of a mounting plate 100. Likewise, the second bore 1017 is configured to align with a second stand mount 155 (FIG. 1A) of the mounting plate 100. When the bores are aligned, the mounting plate 100 may be secured to the first cross-piece section 1010.

The double mounting plate configuration 1000 also includes a second cross-piece section 1020 that may be securely coupled to a second mounting plate 100. The second cross-piece section 1020 includes a first bore 1025 (FIG. 10B) having a first diameter and a second bore 1027 (FIG. 10B) having a second diameter. Embodiments provide that the first bore 1025 is configured to align with a first stand mount 150 (FIG. 1A) of a mounting plate 100. Likewise, the second bore 1027 is configured to align with a second stand mount 155 (FIG. 1A) of the mounting plate 100. When the bores are aligned, the mounting plate 100 may be secured to the second cross-piece section 1020.

The first cross-piece section 1010 also includes a cross-piece bore 1013 (FIG. 10B). According to embodiments, the cross-piece bore 1013 is configured to secure the first cross-piece 1010 to the second cross-piece 1020 using a threaded screw or threaded bolt. The second cross-piece section 1020 also includes a cross-piece bore (not shown) configured to receive a threaded portion of the threaded bolt or threaded screw.

FIG. 10B shows an exploded isometric view of the double mounting plate configuration 1000 of FIG. 10A according to embodiments. The double mounting plate configuration 1000 shown in FIG. 10B enables a photographer to selectively interconnect up to four light sources or speedlights to each of the four mounting assemblies 115 on each of the mounting plates 100. Thus, up to eight speedlights may be interconnected to the double mounting plate configuration 1000.

The double mounting plate configuration of FIG. 10B includes a first cross-piece section 1010 that may be securely coupled to a mounting plate 100. The first cross-piece section 1010 includes a first bore 1015 having a first diameter and a second bore 1017 having a second diameter. Embodiments provide that the first bore 1015 is configured to align with a first stand mount 150 (FIG. 1A) of the mounting plate 100. Likewise, the second bore 1017 is configured to align with a second stand mount 155 (FIG. 1A) of the mounting plate 100. When the bores are aligned, the mounting plate 100 is secured to the first cross-piece section 1010.

The second cross-piece section 1020 includes a first cross-piece bore 1025 having a first diameter and a second cross-piece bore 1027 having a second, larger diameter. The first cross-piece bore 1025 is configured to align with a first stand mount 150 (FIG. 1A) of the mounting plate 100. Likewise, the second cross-piece bore 1027 is configured to align with a second stand mount 155 (FIG. 1A) of the mounting plate 100. The first cross-piece 1010 also includes a plurality of shafts 1019 that protrude from a back planar side of the first cross-piece 1010. Each of the plurality of shafts 1019 are configured to slideably mate with a plurality of receptacles 1029 located on a planar side of the second cross-piece section 1020. The receptacles 1029 and the shafts 1019 are positioned to hold the first mounting plate 100 at a forty-five degree angle with respect to a second mounting plate 100. A threaded screw or bolt may be inserted into a cross-piece bore 1013 and cross-piece bore 1023 to secure the first cross-piece 1010 to the second cross-piece section 1020.

Figure 11:
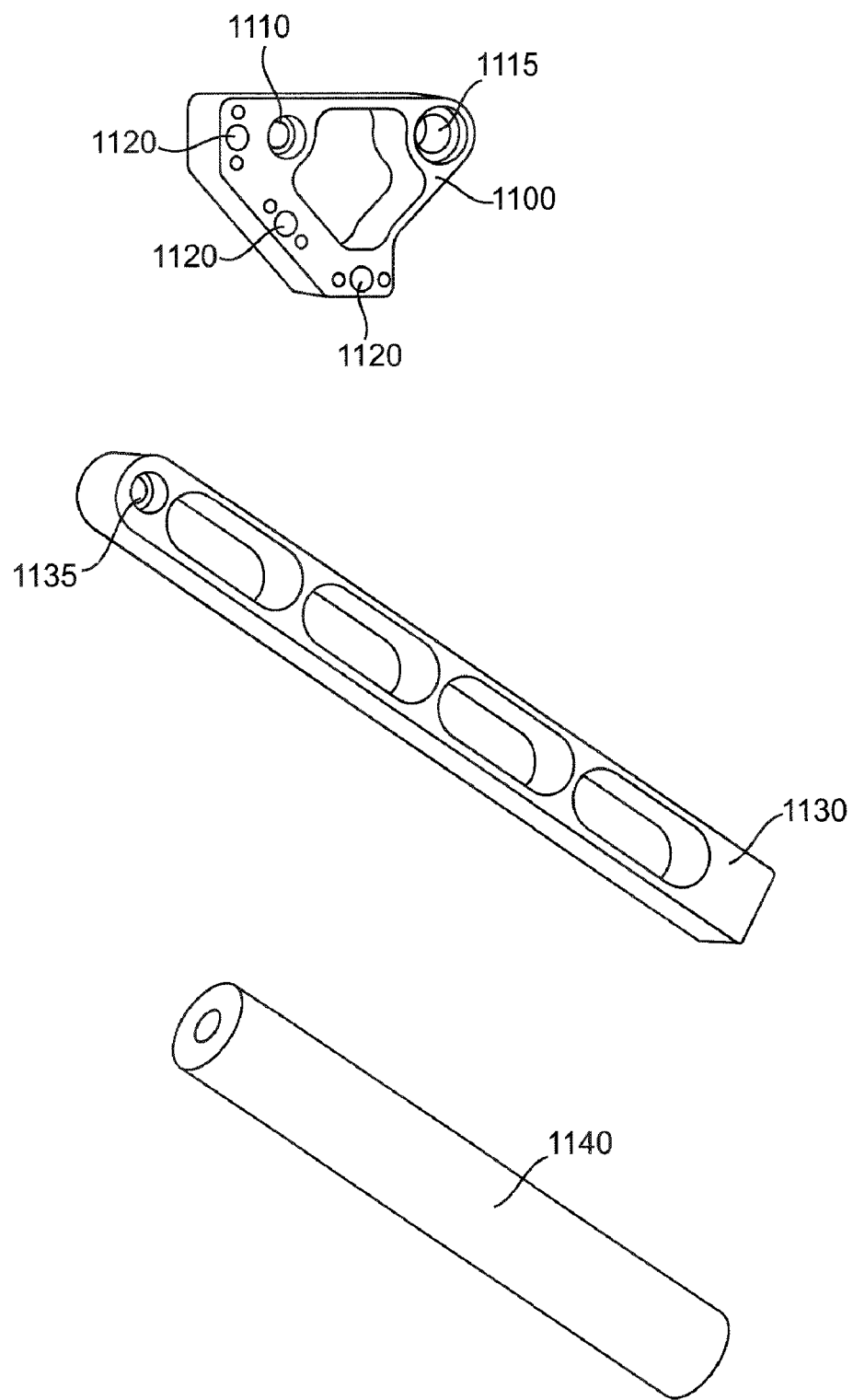
FIG. 11 shows a handle mount, including a handle and handle grip configured to hold at least one mounting plate according to embodiments.

FIG. 11 shows a handle mount 1100, including a handle 1130 and handle grip 1140 configured to hold at least one mounting plate, such as, for example mounting plate 100 (FIG. 1A) according to embodiments. The handle mount 1100 includes a first bore 1110 having a first diameter and a second bore 1115 having a second diameter. The first bore 1110 is configured to align with the first stand mount 150 (FIG. 1A) of a mounting plate 100 and the second bore 1115 is configured to align with the second stand mount 155 (FIG. 1A) of the mounting plate 100. The mounting plate 100 may be secured to the handle mount 1100 using a threaded bolts or screws disposed in each of the bores 1110 and 1115.

According to embodiments, the handle mount 1100 also includes a plurality of handle mount handle bores 1120. Each of the handle mount handle bores 1120 are configured to be coupled with a handle bore 1135 disposed on a distal end of the handle 1130. Embodiments provide that multiple handles 1130 may be coupled to the handle mount 1100 via the handle mount handle bores 1120.

The handle 1130 may be configured to receive a handle grip 1140. According to embodiments, the handle grip 1140 may be a pitched handle. The handle grip 1140 may be made of an elastomeric material, a foam material, or any other material that may make the handle grip 1140 more comfortable to hold. The handle grip 1140 may be secured to one end of the handle 1130 using a threaded bolt or screw. It is contemplated that at least one extension piece (not shown) may be securely coupled to an end of the handle 1130 and also securely coupled to the handle grip 1140 to increase the overall length of the handle 1130. It is also contemplated that the handle 1130 may be secured to a monopod, tripod or other such mounting device and/or stand.

Figure 12:
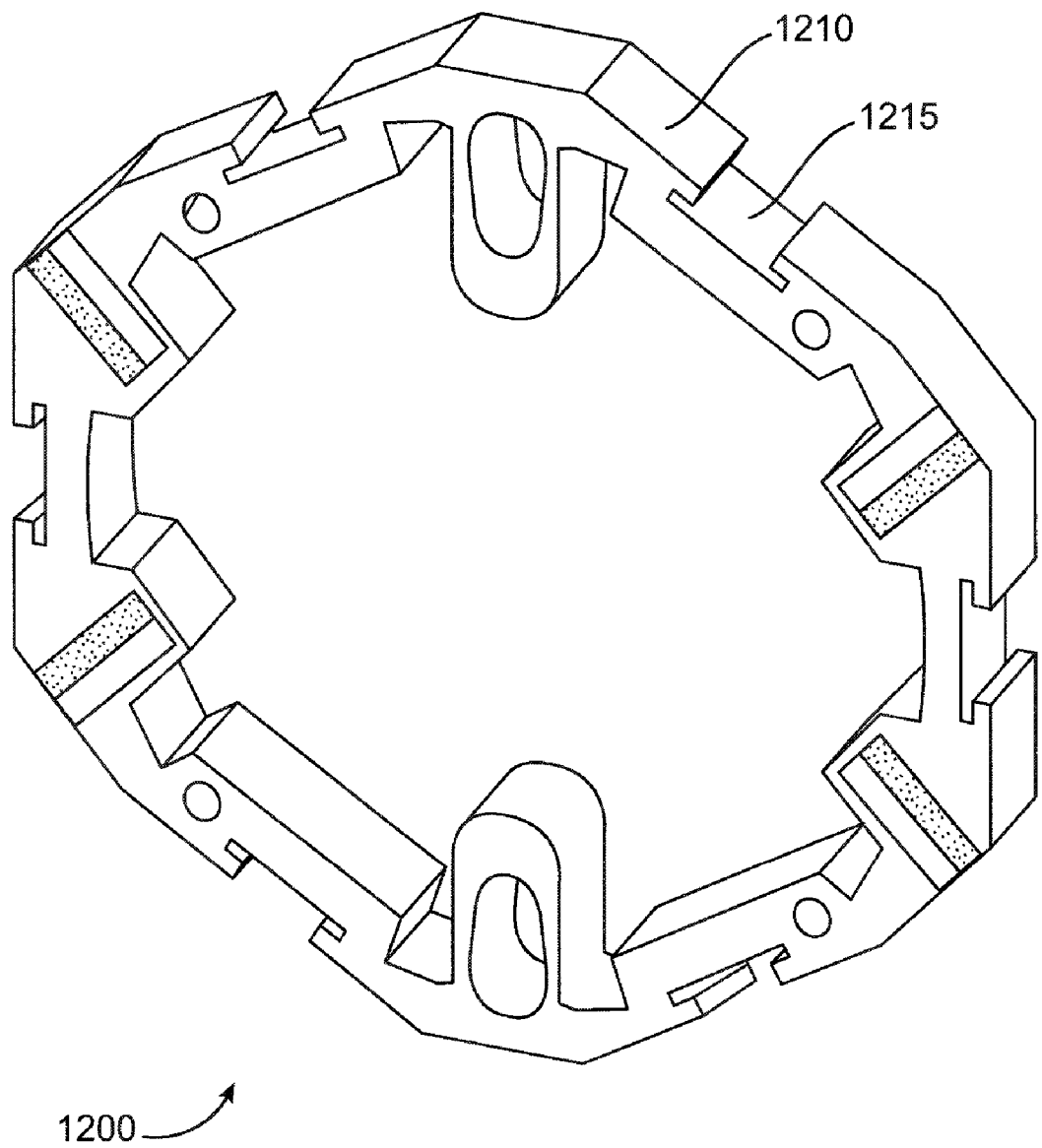
FIG. 12 shows a hexagonal mounting plate having a plurality of mounting interfaces disposed on outer edges of the mounting plate according to embodiments.

FIG. 12 shows a hexagonal mounting plate 1200 having a plurality of mounting interfaces 1215 disposed on outer edges 1210 of the mounting plate 1200 according to embodiments. As shown in FIG. 12, the mounting plate 1200 is generally hexagonal in shape and includes a mounting interface 1215 disposed on each one of the six exterior sides. The mounting interfaces 1215 can be standard cold shoe mount interface configured to secure a hot shoe of a desired photographic resource. The interconnections between the mounting interfaces 1215 and the hot shoes of the photographic resource may be further secured by tightening means, such as screws. However, one skilled in the art will appreciate that similar interconnection mechanisms may be employed, such as clamps, snap fit locks, threading, or any other available fastening means.

The hexagonal mounting plate 1200 may afford a photographer greater latitude in creating desired lighting effects. The hexagonal mounting plate 1200 may also include the aforementioned stand mounts, umbrella mounts, and Soft box mounts to further increase the versatility of such a mounting system. Additionally, a center piece extension 510, strobe mount 610, ninety-degree mount 710, and swivel mount 810 may each be selectively interconnected to one or more of the plurality of mounting interfaces 1215 of the hexagonal mounting plate 1200. The hexagonal mounting plate 1200 may also be configured in a handle configuration as shown and described with respect to FIGS. 9A and 9B, the double mounting plate configuration of FIGS. 10A and 10B, as well as the handle mount shown and described with respect to FIG. 11.

Alternative Embodiments

Although a generally hexagonal shape is discussed and shown in FIG. 12, alternative embodiments provide that a mounting plate may have a generally octagonal shape with one mounting interface disposed on each of the eight sides. Still yet other embodiments provide that a mounting plate may have generally a dodecagon shape having up to twelve mounting interfaces disposed thereon.

In each of the alternative embodiments above it is contemplated each of the center piece extension 510, strobe mount 610, ninety degree mount 710, and swivel mount 810 may be interconnected to the various mounting plates. The octagonal mounting plate may also be configured in a handle configuration as shown and described with respect to FIGS. 9A and 9B, the double mounting plate configuration of FIGS. 10A and 10B, as well as the handle mount shown and described with respect to FIG. 11. Additionally, it is contemplated that each of the center piece extension 510, strobe mount 610, ninety degree mount 710, and swivel mount 810 may be included in the configurations shown in FIG. 9A-FIG. 12. For example, the center piece extension 510 may be coupled to the handle configuration 900 of FIG. 9B. Such a configuration would enable a total of nine speedlights to be interconnected to the handle configuration 900.

Although illustrative embodiments of the invention have been described in detail herein with reference to the accompanying drawings, it is to be understood that the invention is not limited to those precise embodiments. For example, the mounting device described herein may be used for mounting other photographic accessories such as light meters, viewfinders and range finders in close proximity to other lighting sources or elements. Still yet other embodiments provide that the mounting device such as the one described herein may be used for mounting multiple lighting sources or elopements that may be useful in the film and video industries. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A mounting plate comprising:
a plurality of exterior edges, wherein each edge has a mounting interface disposed thereon;
a plurality of exterior planar corners disposed between at least two of the plurality of exterior edges, wherein each planar corner has a pole mount disposed thereon;
a plurality of interior projections;
at least one stand mount disposed on at least a first one of the plurality of interior projections; and
at least one umbrella mount disposed on at least a second one of the plurality of interior projections.

2. The mounting plate of claim 1, wherein each mounting interface disposed on each of the plurality of exterior edges is configured to receive a shoe of a speedlight.

3. The mounting plate of claim 1, further comprising a threaded bore on an inner surface of at least one of the plurality of interior projections.

4. The mounting plate of claim 1, further comprising a threaded bore disposed on a center axis of the each mounting interface.

5. The mounting plate of claim 4, wherein the threaded bore of each mounting interface is configured to receive a screw, wherein the screw is configured to secure either i) a shoe of a speedlight; or ii) a base portion of a mounting accessory.

6. The mounting plate of claim 1, wherein each mounting interface disposed on each of the plurality of exterior edges is configured to receive a mounting accessory.

7. The mounting plate of claim 6, wherein the mounting accessory is a swivel mount.

8. The mounting plate of claim 6, wherein the mounting accessory is a ninety-degree mount.

9. The mounting plate of claim 6, wherein the mounting accessory is a strobe light mount.

10. The mounting plate of claim 1, further comprising a removable center mount, wherein the removable center mount has at least one bore disposed on a distal end of the center mount and wherein the at least one bore is configured to align with the at least one stand mount.

11. The mounting plate of claim 1, wherein each pole mount is configured to receive an extender shaft.

12. A mounting plate for a plurality of camera light sources comprising:
a cold shoe mount disposed on each outer side of the mounting plate, wherein the cold shoe mount is configured to receive and secure a camera light source;
a plurality of planar corner edges disposed between each outer side of the mounting plate;
a pole mount disposed on each of the of plurality of planar corner edges;
a plurality of interior projections, wherein at least one interior projection of the plurality of interior projections are disposed on an interior side of each of the plurality of planar corner edges;
an umbrella mount disposed on at least a first one of the plurality interior projections; and
a stand mount disposed on at least a second one of the plurality of interior projections.

13. The mounting plate of claim 12, further comprising a second stand mount disposed on a third one of the plurality of interior projections, wherein the second stand mount has a diameter different than a diameter of the stand mount disposed on at least the second one of the plurality of interior projections.

14. The mounting plate of claim 12, further comprising a plurality of threaded bores disposed on a center axis of each cold shoe mount.

15. The mounting plate of claim 12, wherein each cold shoe mount is configured to receive and secure a mounting plate accessory.

16. The mounting plate of claim 12, further comprising a threaded bore disposed on an inner side of the first one of the plurality of inner projections.

17. A mounting plate comprising:
a first side having a first mount disposed thereon;
a second side having a second mount disposed thereon;
a third side having a third mount disposed thereon;
a fourth side having a fourth mount thereon;
a plurality of corners disposed between each of the first, second third and fourth sides, wherein each of the plurality of corners has a receptacle disposed therein;
a first set of interior projections coupled to inner portions of a first corner of the plurality of corners and a second corner of the plurality of corners respectively, wherein a first interior projection of the first set of interior projections has a first threaded hole having a first diameter disposed therein and wherein a second interior projection of the first set of interior projections has a second threaded hole having a second diameter disposed therein;
a second set of interior projections coupled to inner portions of a third corner of the plurality of corners and a fourth corner of the plurality of corners respectively, wherein a first interior projection of the second set of interior projections has a first umbrella mount and wherein a second interior projection of the second set of interior projections has a second umbrella mount; and
first and second threaded bores disposed on a central axis of an inner side of each of the second set of interior projections.

18. The mounting plate of claim 17, wherein each of the first mount, the second mount, the third mount and the fourth mount are configured to receive and secure a light source for a camera.

19. The mounting plate of claim 17, wherein each of the first mount, the second mount, the third mount and the fourth mount are configured to receive and secure an accessory mount.

20. The mounting plate of claim 17, wherein each of the first threaded hole and the second threaded hole are configured to receive a mounting pole.

* * * * *